United States Patent
Smiddy et al.

(10) Patent No.: US 11,778,117 B2
(45) Date of Patent: Oct. 3, 2023

(54) INTELLIGENT SCANNER DEVICE

(71) Applicant: Bank of America Corporation, Charlotte, NC (US)

(72) Inventors: David J. Smiddy, Chadds Ford, PA (US); Mousumi Chatterjee, Plano, TX (US); James Alexander, Dripping Springs, TX (US); Himanshu Goyal, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 417 days.

(21) Appl. No.: 16/739,548

(22) Filed: Jan. 10, 2020

(65) Prior Publication Data

US 2021/0216585 A1 Jul. 15, 2021

(51) Int. Cl.
| | |
|---|---|
| *H04N 1/00* | (2006.01) |
| *G06F 16/583* | (2019.01) |
| *G06F 16/51* | (2019.01) |
| *H04N 1/21* | (2006.01) |
| *G06V 30/413* | (2022.01) |
| *G06V 30/40* | (2022.01) |
| *G06V 30/12* | (2022.01) |
| *G06V 30/10* | (2022.01) |

(52) U.S. Cl.
CPC .......... *H04N 1/0097* (2013.01); *G06F 16/51* (2019.01); *G06F 16/583* (2019.01); *G06V 30/133* (2022.01); *G06V 30/40* (2022.01); *G06V 30/413* (2022.01); *H04N 1/2187* (2013.01); *G06V 30/10* (2022.01)

(58) Field of Classification Search
None
See application file for complete search history.

(56) References Cited

U.S. PATENT DOCUMENTS

| | | | | |
|---|---|---|---|---|
| 11,182,544 | B2* | 11/2021 | Roebuck | G06V 10/945 |
| 2010/0277772 | A1* | 11/2010 | Destree | G06V 30/40 |
| | | | | 358/448 |
| 2019/0121822 | A1* | 4/2019 | Troppe | G06F 16/5866 |
| 2021/0075788 | A1* | 3/2021 | Pasterk | G06F 16/532 |

\* cited by examiner

*Primary Examiner* — Giuseppi Giuliani
(74) *Attorney, Agent, or Firm* — Banner & Witcoff, Ltd.

(57) ABSTRACT

An intelligent scanner device configured to facilitate improved accuracy for storage of scanned documentation. The scanner device may include an image processor, an identification engine, and a metadata engine. The scanner device may utilize artificial intelligence processes to generate metadata information to be stored with scanned documents.

22 Claims, 6 Drawing Sheets

INTELLIGENT SCANNER DEVICE

TECHNICAL FIELD

Aspects of this disclosure generally relate document scanning devices. In particular, aspects of the disclosure relate a device that scans and stores data related to physical documents.

BACKGROUND

Physical documents may be digitally scanned, saved and retrieved from a file system. To aid with achieving, search and retrieval, certain pieces of information, referred to as metadata, may be saved along with the scanned documents. However, manually inputting this metadata information is prone to human error, and may be incomplete. Currently, no device exists that enforces rules to prevent digital scans from being saved if they lack certain pieces of information, as well as a device that can automatically generate metadata to satisfy those rules.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure relates to an intelligent scanner device that includes an image processor that is configured to capture image data, and an identification engine, configured to receive identification information associated with a user. The scanner device may also include a metadata engine, configured to automatically generate first metadata for the received image data, based on the identification information associated with the user. The metadata engine may also receive and verify second metadata for the received image data, from an external source. The metadata engine may further implement a data retention process preventing the received image data from being stored within an internal storage device until the first and second metadata fulfill one or more metadata thresholds. The metadata engine may further combine the first and second metadata with the captured image data to generate an indexed image structure, and store the indexed image structure in the internal storage device.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. It is noted that these connections are general and, unless otherwise specified, may be direct or indirect, wired or wireless, and that the specification is not intended to be limiting in this respect.

Figure 1:
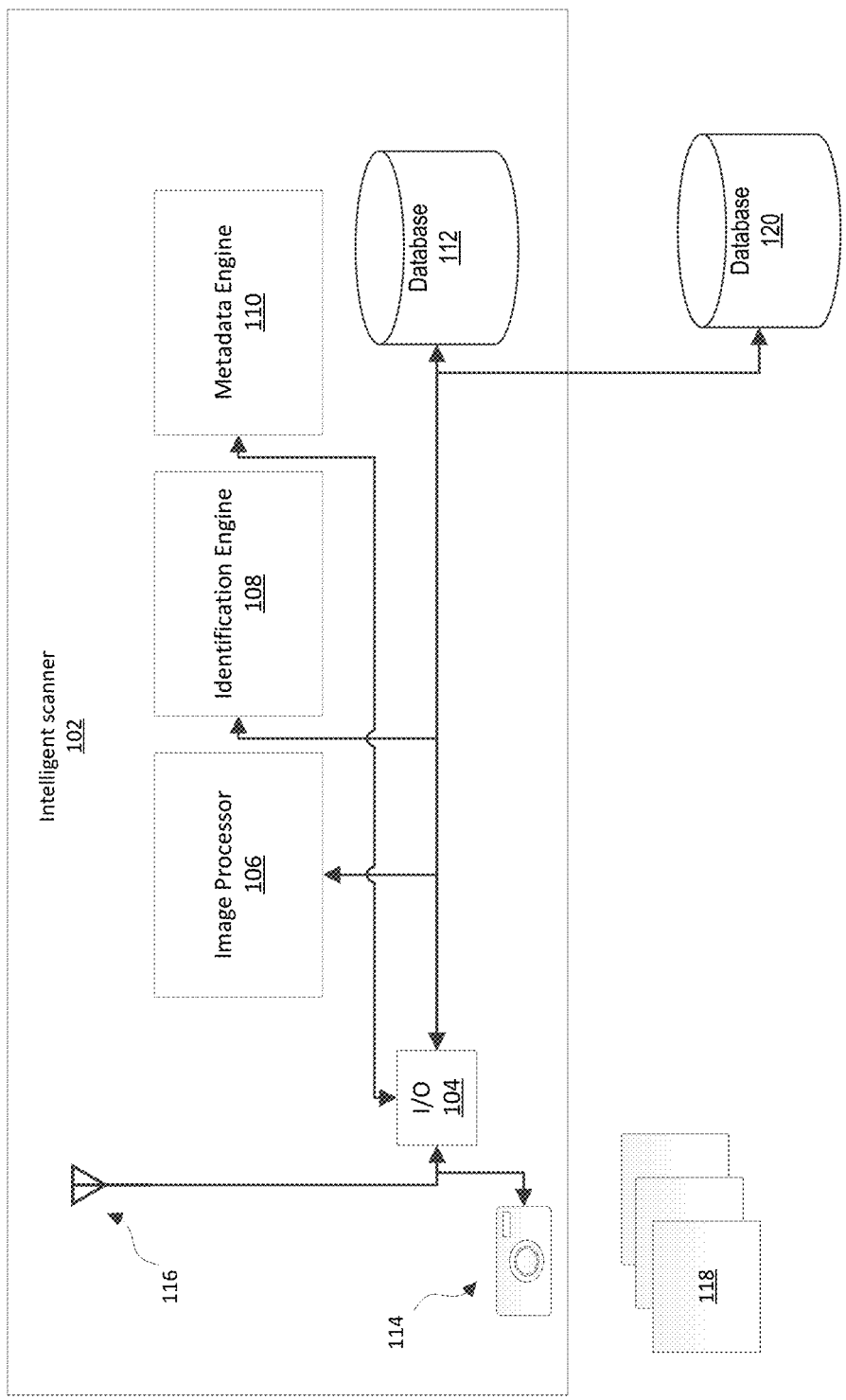
FIG. 1 schematically depicts an intelligent scanner device, according to one or more aspects described herein.

FIG. 1 schematically depicts an intelligent scanner device 102, according to one or more aspects described herein. The device 102 includes an interface (I/O) 104 that is configured with hardware, firmware, and/or software to communicate between various components of the scanner device 102, and with elements external to the device 102. As such, the interface 104 may be configured to communicate using wired or wireless communication protocols across one or more network types. Accordingly, the intelligent scanner device 102 may be configured to connect wirelessly or by wired connection to a local network, a wide area network, and/or the Internet. The interface 104 may additionally include a user interface configured with one or more of a screen, speakers, and/or input hardware (keyboard, digitizer facilitating the use a touch screen input, among others). The intelligent scanner device 102 may be configured to generate graphical user interfaces in order to facilitate scanning and retention of scanned images of the physical documents 118.

An image processor 106 may be configured to receive captured image data from an image-capturing device 114 of the scanner device 102. In one implementation, the image processor 106 may be configured with firmware and/or software to interpret an image data signal communicated as raw data, or any data type, including any data type used for communication of digital imagery. Examples of these data types may include RAW, TIFF, PNG, GIF, JPG, BMP, PSD, PSP, among others. The image processor 106 may be configured to receive image data of any size and/or resolution. In certain examples, the image processor 106 may be configured to interpret data received from a charge-coupled device (CCD) of the image-capturing device 114 and produce a digital image in one or more image file formats.

The intelligent scanner device 102 may additionally include an identification engine 108 that is configured to receive identification information associated with a user of the device 102. Accordingly, the identification engine 108 may receive one or more pieces of information provided directly by the user, and/or one or more pieces of information provided by a source separate from the user. For example, the identification engine 108 may receive from the user a passcode that uniquely identifies the user. Additionally or alternatively, the identification engine 108 may receive one or more pieces of biographic information from the user. The identification engine 108 may receive a geographic location of the scanner device 102 and a list of geographic locations at which the user is authorized to complete one or more scanning processes using the intelligent scanner device 102. In one example, the geographic location of the intelligent scanner device 102 (and a user of the device 102) is determined based upon a location-determining sensor, or global positioning system (GPS) signal received by antenna 116.

In one example, the identification engine 108 is configured to receive and interpret an image or video of the user of the device 102, captured by the image-capturing device 114. This user image or video may be used to identify the user, based upon a saved user profile that stores one or more images or videos of one or more users who have been authorized to operate the intelligent scanner device 102. It is contemplated that any image recognition and/or facial recognition processes may be utilized in this regard to identify the user.

In one example, the image-capturing device 114 is configured to generate image data of one or more physical documents, schematically depicted as documents 118 in FIG. 1. In one example, the documents 118 may be any form of paperwork or artwork represented on physical papers. In another example, the documents 118 may represent a three-dimensional object that is imaged by the image capturing device 114. In one example, the intelligent scanner device 102 may be configured with a feeder mechanism that is configured to mechanically feed one or more sheets of paper through a scanning area of the device 102. In another example, the documents 118 may be imaged after being placed on a surface external to the device 102, Further, the identification engine 108 may configured to recognize document information from the captured image data using one or more optical character recognition (OCR) processes. It is contemplated that any character recognition processes may be utilized by the identification engine 108, without departing from the scope of these disclosures.

The intelligent scanner device 102 additionally includes a metadata engine 110. This metadata engine 110 is configured to automatically generate first metadata indices for the received image data, based upon the identification information associated with the user of the intelligent scanner device 102. This identification information may be received by the metadata engine 110 from the identification engine 108. The first metadata may include an identifier associated with the user of the scanner device 102. This identifier may include a name, an identification number, an image of the user, a date of birth of the user, a location of the user and the scanner device 102, among others. The first metadata may additionally include a document type of the documents 118, a number of pages of the documents 118, a number of words of the documents 118, a number of characters of the documents 118, a language of the documents 118, a prioritization level of the documents 118, or a sensitivity level of the documents 118, a description of the documents 118, among others. In one example, the prioritization level of the documents 118 may include a metric that indicates that the processing of the documents 118 should be expedited. The sensitivity level of the documents 118 may indicate whether the information contained within the documents 118 is publicly available or non-public. The various components of the first metadata generated by the metadata engine 110 may be automatically generated using one or more optical character recognition processes, or using one or more sensor devices. For example, the antenna 116 may be utilized to determine a geographic location of the intelligent scanner device 102 and the user. The image-capturing device 114 may be configured to capture an image of the user. Additionally, the intelligent scanner device 102 may include a sensor configured to identify an RFID, QR code or other identification element in the possession of the user of the device 102.

The metadata engine 110 may be configured to receive and verify second metadata. This second metadata may also be associated with the received image data received from the image processor 106. This second metadata may be received from an external source. In one example, the second metadata indicates whether the documents 118 pertain to a person who presented those documents 118 to the user of the scanner device 102. In one example, this indication may be made based upon a recognition of one or more pieces of biographic information within the documents 118, and a comparison to an identifier associated with the person who presented the documents ("document presenting person"). In another example, the second metadata may include enterprise information associated with one or more enterprises referenced within the documents 118. In one example, the second metadata may determine that the one or more enterprises referenced within the documents 118 are public companies or are non-public companies, or a combination thereof. In one example, the second metadata may be generated based upon information received from an internal database 112 and/or an external database 120. It is contemplated that the databases 112 and 120 may have any form configured to store and serve stored information to the various components of the intelligent scanner device 102. The metadata engine 110 may verify the second metadata by comparing information stored within the internal database 112 to information received from an external database 120. In one example, the external database 120 may be a public repository, may be a third party database, or may be a database internal to an enterprise within which the intelligent scanner device 102 is configured to be operated.

The metadata engine 110 may additionally be configured to implement a data retention process for storing the image data received by the image processor 106. In one example, the data retention processes may be configured to prevent the received image data from being stored within a storage device until the first and second metadata fulfill one or more metadata index thresholds. In one example, a user of the scanner device 102 may not be able to save images generated by the image capturing device 114 of the documents 118 unless the first and second metadata fulfill one or more information requirements. In one example, these information requirements may not be entered manually by the user of the scanner device 102 and may only be generated based upon information detected by the intelligent scanner device 102. This detection may be from information recognized within the documents 118, or from additional data provided to the scanner device 102, which may include, among others, location information, automatic recognition of a user of the scanner device 102, or data provided by the internal database 112 and/or external database 120. In another example, a subset or all of the one or more information requirements may be manually entered by the user of the scanner device 102, if not otherwise automatically generated by the scanner device 102. In yet another example, a subset of all of the one or more requirements may be manually entered by another person who is not directly operating the scanner device 102.

In one example, the one or more metadata index thresholds may be generated based upon a document type of the imaged documents 118. As such, the one or more metadata index thresholds may be automatically generated based upon a detected characteristic of the imaged documents 118, or may be automatically generated based upon a manual input of a document type of the documents 118. The metadata engine 110 may additionally be configured to execute one or more processes to combine the first and second metadata with the captured image data to generate an indexed image structure. The indexed image structure may be saved within the internal database 112 or the external database 120. Advantageously, the indexed image structure may be more easily retrieved from one or more of the database 112 and/or database 120, due to the data retention processes implemented by the metadata engine 110 ensuring that the first and second metadata associated with the indexed image structure are above the one or more metadata index thresholds. It is contemplated that any specific data structure type or file type may be used to store the indexed image structure.

In one example the data retention processes executed by the metadata engine 110 may prevent the image data received from the image processor 106 from being stored within the database 112 and/or the database 120 if the identification engine 108 detects that the image data is blurred. In another example, the data retention processes executed by the metadata engine 110 may prevent the image data received from the image processor 106 from being stored within the database 112 and/or the database 120 if the identification engine 108 detects that the image data is incomplete. For example, the identification engine 108 may detect that one or more characters, words, or sentences are incomplete or cutoff. In another example, the completeness of the images of the documents 118 may be determined based upon the presence or absence of boundary markers within the document images.

In one example, the data retention processes executed by the metadata engine 110 may prevent the image data received from the image processor 106 from being stored within the database 112 and/or the database 120 if the geographic location of the user of the intelligent scanner device 102 does not align with an approved location for the user.

It is contemplated that the intelligent scanner device 102 may store the indexed image structure in any file system or database system. Further, the indexed image may be retrieved using any database query/search tool or program, without departing from the scope of these disclosures.

Figure 2:
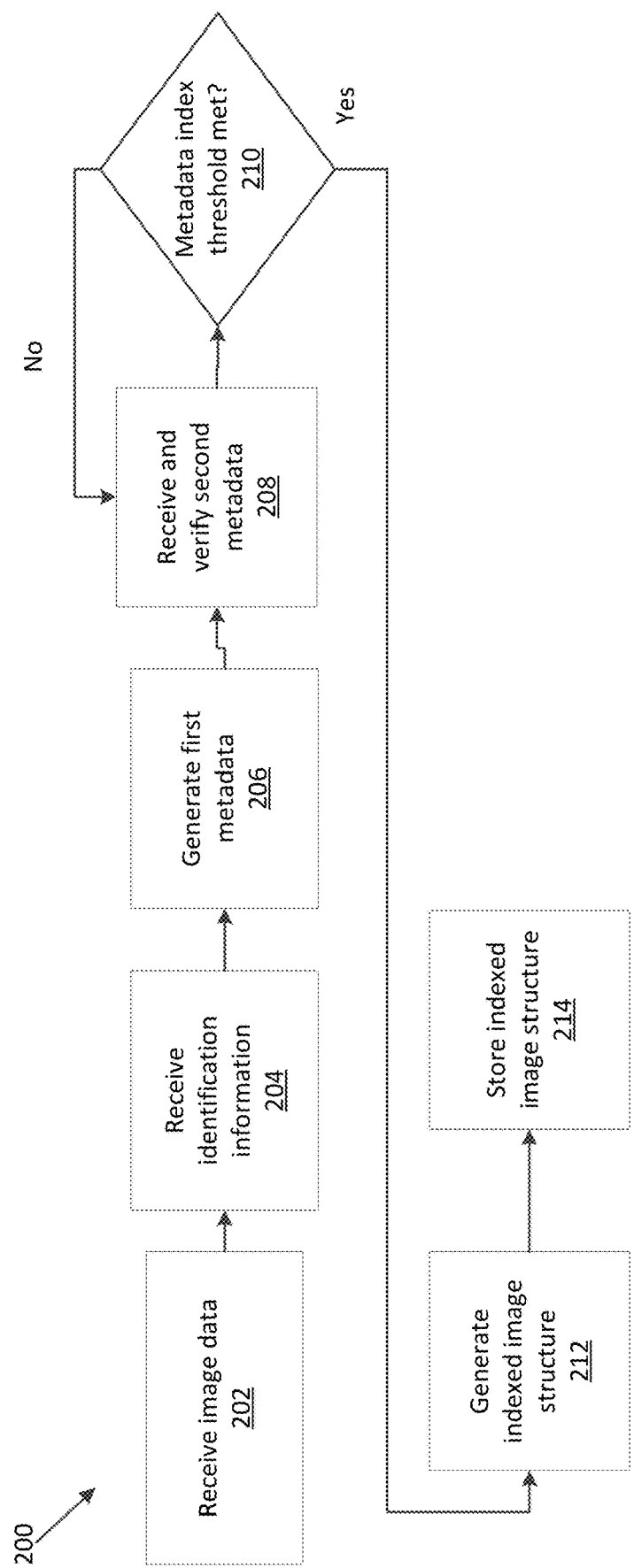
FIG. 2 is a flowchart diagram of a process for receiving and storing image data by the intelligence scanner device, according to one or more aspects described herein.

FIG. 2 is a flowchart diagram 200 of a process for receiving and storing image data by the intelligence scanner device 102, according to one or more aspects described herein. One or more processes may be executed at block 202 to receive image data. These one or more processes may be executed by the image processor 106. One or more processes may be executed at block 204 to receive identification information. These one or more processes may be executed by the identification engine 108. Further, one or more processes may be executed to generate first metadata at block 206. These one or more processes may be executed by the metadata engine 110. The metadata engine 110 may additionally execute one or more processes to receive and verify second metadata at block 208. Decision block 210 represents one or more processes executed to determine whether the first and second metadata meet a metadata index threshold. Accordingly, decision block 210 may be executed by the metadata engine 110. If the metadata index threshold is not met, flowchart 200 may cycle back to block 208. Additionally or alternatively, block 208 may request manual inputs from the user of the intelligence scanner device 102. If the one or more metadata index thresholds are met at block 210, flowchart 200 may proceed to block 212. One or more processes may be executed at block 212 to generate an indexed image structure. These one or more processes to generate the indexed image structure may be executed by the metadata engine 110 of the intelligence scanner device 102. Block 214 of flowchart 200 represents one or more processes that may be executed to store the indexed image structure. Accordingly, the one or more processes of block 240 may be executed by the metadata engine 110.

Figure 3:
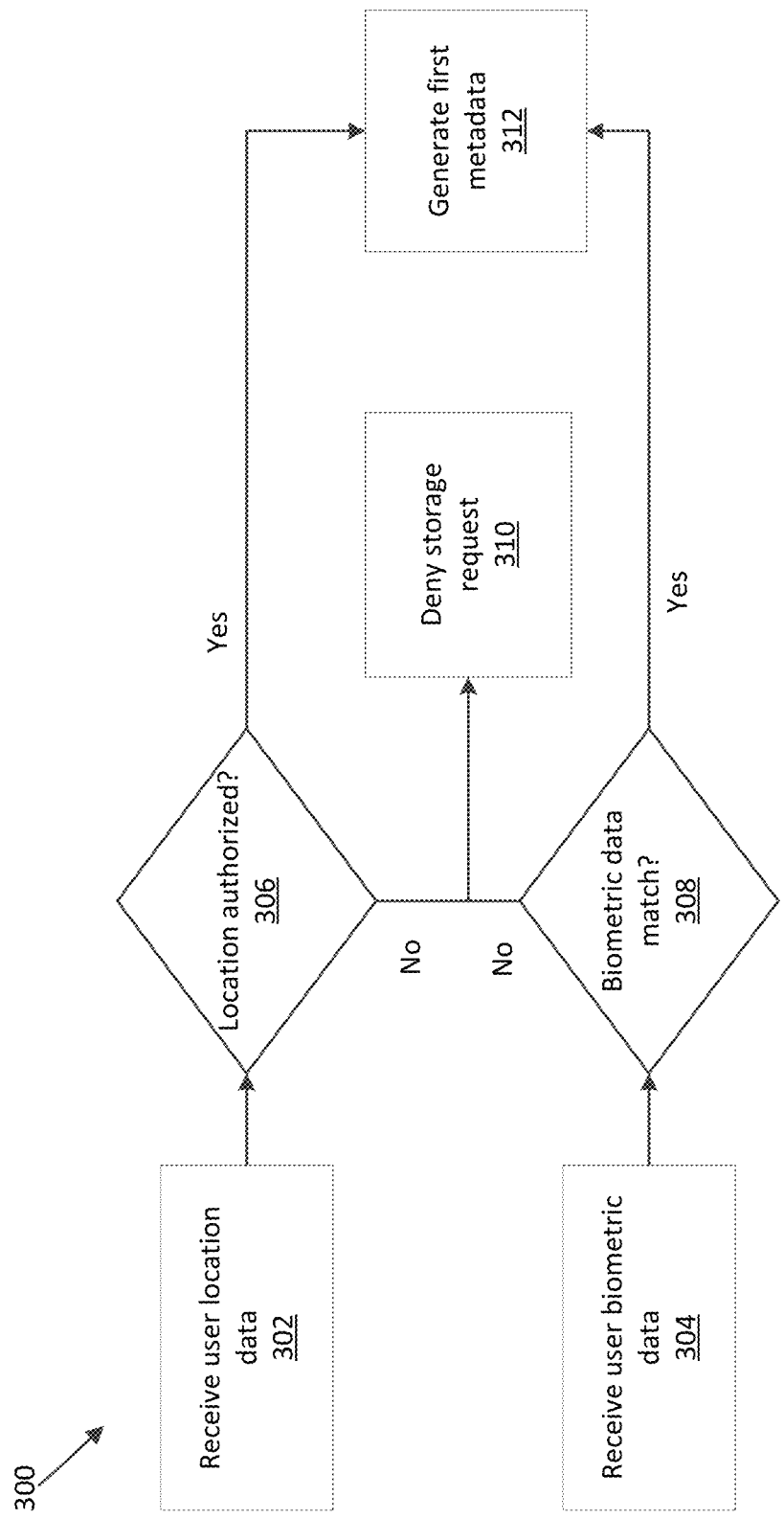
FIG. 3 is a flowchart diagram that may be used to receive identification information associated with a user of the intelligence scanner device, according to one or more aspects described herein.

FIG. 3 is a flowchart diagram 300 that may be used to receive identification information associated with a user of the intelligence scanner device 102, according to one or more aspects described herein. One or more processes may be executed at block 302 to receive user location data. This user location data may be received from a location-determining sensor, and may be received by the identification engine 108. One or more processes may be executed at decision block 306 to determine whether the detected location of the user and the intelligent scanner device 102 is an authorized location. Accordingly, a user may only be authorized to operate the scanner device 102 at certain predetermined locations. E.g., one or more office locations of an enterprise associated with the intelligence scanner device 102 may be authorized. If it is detected at that the location of the user is not authorized, process 300 may proceed to block 310, and a request to store image data from the intelligent scanner device 102 may be denied. If the detected location is authorized, process 300 may proceed to block 312. Accordingly, one or more processes may be executed at block 312 to generate first metadata associated with the imaged documents.

One or more processes may be executed at block 304 to receive user biometric data. This biometric data may include an image of the user of the device 102, one or more passwords, one or more tokens provided by devices in possession of the user (e.g., RFID signals, QR code images), one or more fingerprints or scans of a user (e.g., facial scan, iris scan, hand scan, among others). One or more processes may be executed at decision block 308 to determine whether the received biometric data matches stored data associated with the user of the intelligence scanner device 102. If it is detected that the biometric data does not match the user, flowchart 300 may again proceed to block 310, and a request to store image data from the intelligent scanner device 102 may be denied. If the received biometric data matches stored biometric data associated with the user, flowchart 300 may proceed to block 312, and first metadata may be generated for the image data.

Figure 4:
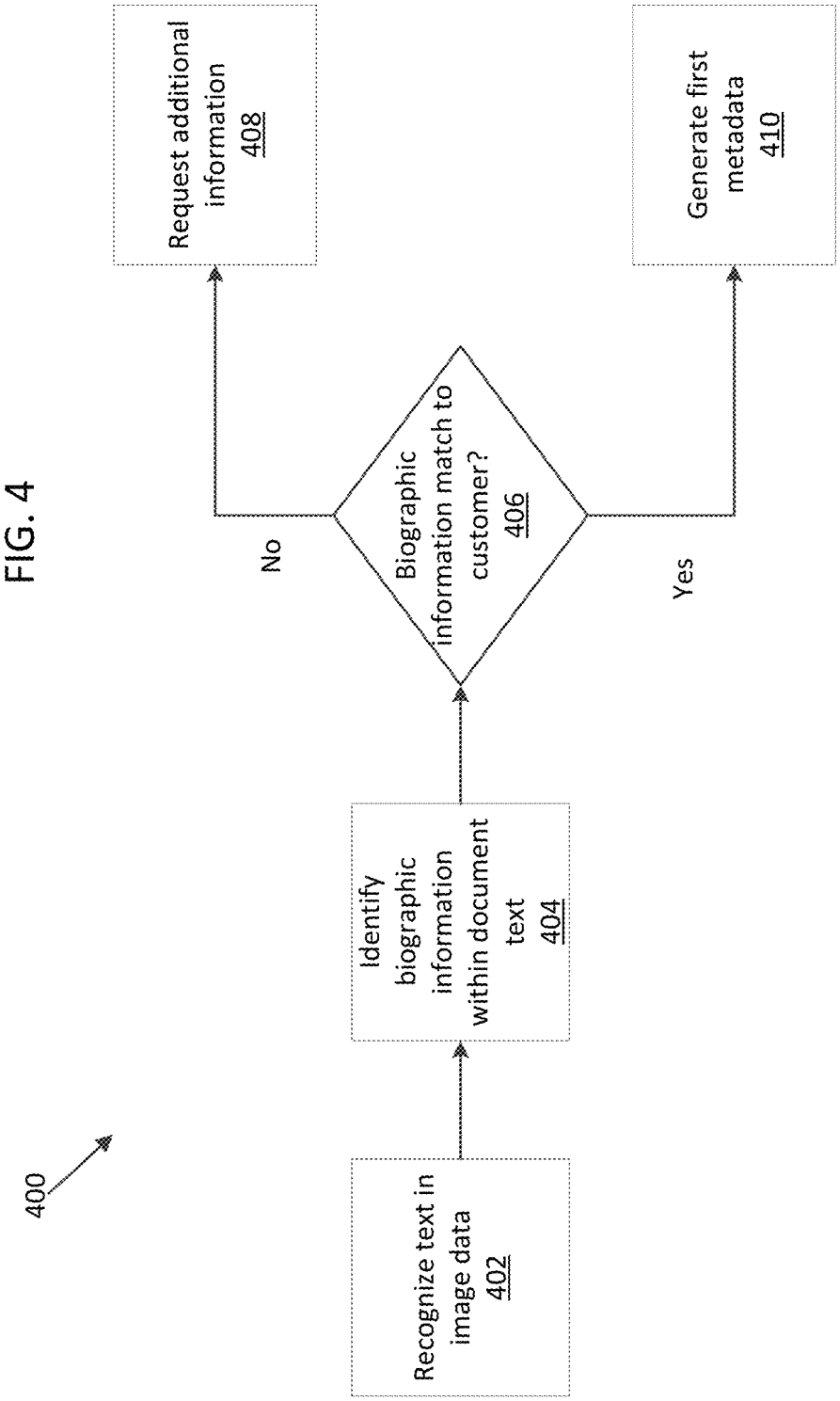
FIG. 4 is a flowchart diagram that may be used to receive and verify customer information from an imaged document, according to one or more aspects described herein.

FIG. 4 is a flowchart diagram 400 that may be used to receive and verify customer information from an imaged document, according to one or more aspects described herein. In one example, one or more processes may be executed at block 402 to recognize text in an imaged document. These one or more processes may include any optical character recognition processes known to those of ordinary skill in the art. Block 404 may execute one or more processes to identify biographic information within the document text. Accordingly, these one or more processes may compare detected words or strings to stored information associated with customers of the enterprise using the intelligent scanner device 102. Decision block 406 may execute one or more processes to compare biographic information detected within the document text to biographic information provided by a customer. In one example, the customer may provide the documents 118 to the user of the scanner device 102. As such, the biographic information of the customer may include a name, an address, a date of birth, one or more account numbers, among others. If the biographic information provided by the customer does not match biographic information detected within the imaged documents, flowchart 400 may proceed to block 408. At block 408, one or more processes may be executed to request additional information from the customer. This additional information may be utilized to determine a relationship between the customer and the provided documents. If it is determined that the biographic information provided by the customer matches biographic information detected within the imaged documents, flowchart 400 may proceed to block 410, and one or more processes may be executed to generate first metadata.

Figure 5:
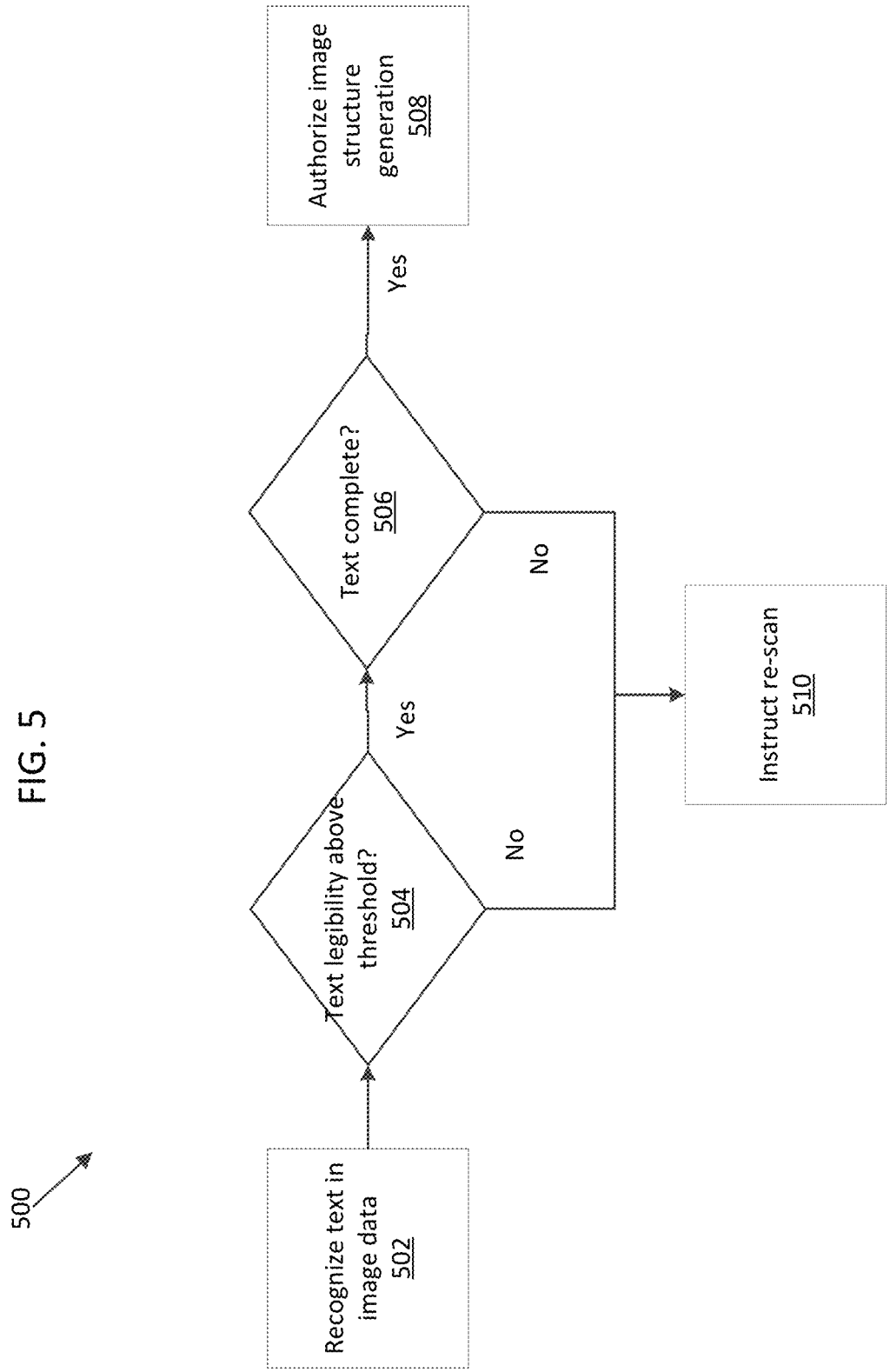
FIG. 5 is a flowchart diagram that may be used to detect a quality of an imaged document, according to one or more aspects described herein.

FIG. 5 is a flowchart diagram 500 that may be used to detect a quality of an imaged document, according to one or more aspects described herein. In one example, one or more processes may be executed at block 502 to recognize text within document image data. In one example, the one or more processes executed at block 502 may be executed by the image processor 106. As previously described in this disclosure, any optical character recognition processes may be used, without departing from the scope of these disclosures. Decision block 504 may execute one or more processes to determine whether the text within the received image data is above a legibility threshold. In one example, the one or more processes executed to determine whether the text is above a legibility threshold may be executed by the identification engine 108. In one example, the determination as to whether the text is above a legibility threshold may be based upon a manual input, or may be automatically determined using one or more recognition processes. If it is determined that the text is not above a legibility threshold as a result of blur, or another artifact, flowchart 500 may proceed to block 510. Accordingly, at block 510, one or more processes may be executed to instruct the user of the device 102 to re-scan the document. If the text is above a legibility threshold, flowchart 500 may proceed to decision block 506. Accordingly, at block 506, one or more processes may be executed to determine if the text is complete. These one or more processes executed to determine whether the text is complete may be executed by the identification engine 108. Accordingly, the one or more processes may detect that one or more words have been partially or wholly omitted from the image of the physical documents scanned by the intelligent scanner device 102. In one example, the one or more processes may automatically determine whether the scanned text is complete by comparing the identified text to stored text within database 112 or database 120. For example, certain sentences/text strings may be standardized for specific document types, and the one or more processes executed at block 506 may compare the detected text to the standardized text that should be present within the document. In another example, the one or more processes executed at decision block 506 may detect incomplete text within document imagery using optical character recognition. If it is detected that the text is incomplete, flowchart 500 may proceed to block 510 and one or more processes may be executed to instruct the user of the device 102 to re-scan the documents 118. It is determined that the text is complete, flowchart 500 may proceed to block 508 and one or more processes may be executed to authorize image structure generation by the metadata engine 110.

In one implementation, the intelligent scanner device 102 may be configured to utilize one or more artificial intelligence processes in order to, among others, recognize text within scanned image data, determine that the scanned image text is incomplete and/or illegible, determine an author of one or more scanned documents, determine an owner of one or more scanned documents, determine a sensitivity and/or a prioritization level associated with one or more scanned documents, determine an appropriate storage location for one or more scanned documents, among others. It is contemplated that the intelligent scanner device 102 may utilize various forms of artificial intelligence. Accordingly, in one example, the intelligent scanner device 102 may utilize a system of machine learning and/or artificial intelligence to improve various determinations made by the device 102, as explained in further detail below.

A framework for machine learning may involve a combination of one or more components, which may include three components: (1) representation, (2) evaluation, and (3) optimization components. Representation components refer to computing units that perform steps to represent knowledge in different ways, including but not limited to: as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making. Moreover, machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

In an embodiment involving supervised machine learning, a graph module corresponding to an artificial neural network may receive and execute instructions to modify the computational graph. A supervised machine learning model may provide an indication to the graph module that output from the machine learning model was correct and/or incorrect. In response to that indication, the graph module may modify one or more nodes and/or edges to improve output. The modifications to the nodes and/or edges may be based on a prediction, by the machine learning model and/or the graph module, of a change that may result an improvement. The modifications to the nodes and/or edges may be based on historical changes to the nodes and/or edges, such that a change may not be continuously made and unmade (an undesirable trend which may be referred to as oscillation). Feedback may be additionally or alternatively received from an external source, such as an administrator, another computing device, or the like. Where feedback on output is received and used to reconfigure nodes and/or edges, the machine learning model may be referred to as a supervised machine learning model.

In supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of one hundred photos with labeled human faces and ten thousand random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

In one example, a machine learning engine may identify relationships between nodes that previously may have gone unrecognized, for example, using collaborative filtering techniques. This realization by the machine learning engine may increase the weight of a specific node; and subsequently spread weight to connected nodes. This may result in particular nodes exceeding a threshold confidence to push those nodes to an updated outcome from a Boolean false to a Boolean true. Other examples of machine learning techniques may be used in combination or in lieu of a collaborative filtering technique.

In addition, one theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components may be manually tuned by to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals more clear, given the nearly infinite number of variables that can possible be optimized in the machine learning system.

In some embodiments, one or more of the processes executed by the intelligent scanner device 102 may use a system of machine learning and/or artificial intelligence to improve accuracy of the determinations made by said device 102. As explained herein, a framework for machine learning may involve a combination of supervised and unsupervised learning models.

Advantageously, the intelligent scanner device 102 may facilitate more accurate and/or efficient storage and retrieval of scanned documentation by enforcing document/data retention processes that mandate certain metadata index thresholds before document imagery may be stored.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed herein may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

The various elements described throughout this disclosure may be implemented as standalone hardware elements, or as a combination of hardware, firmware, and software components. For example, each of the elements of FIG. 1 may be implemented as standalone hardware elements embodied as application-specific integrated circuits or similar hardware elements. In another example, two or more of the elements of FIG. 1 may be combined together and implemented as dedicated hardware elements. In yet another example, one or more elements of FIG. 1 may be implemented as firmware and/or software modules. Further, one or more of the elements of FIG. 1 may be embodied using a general-purpose or specialized computing system, such as computing system 600 from FIG. 6.

Figure 6:
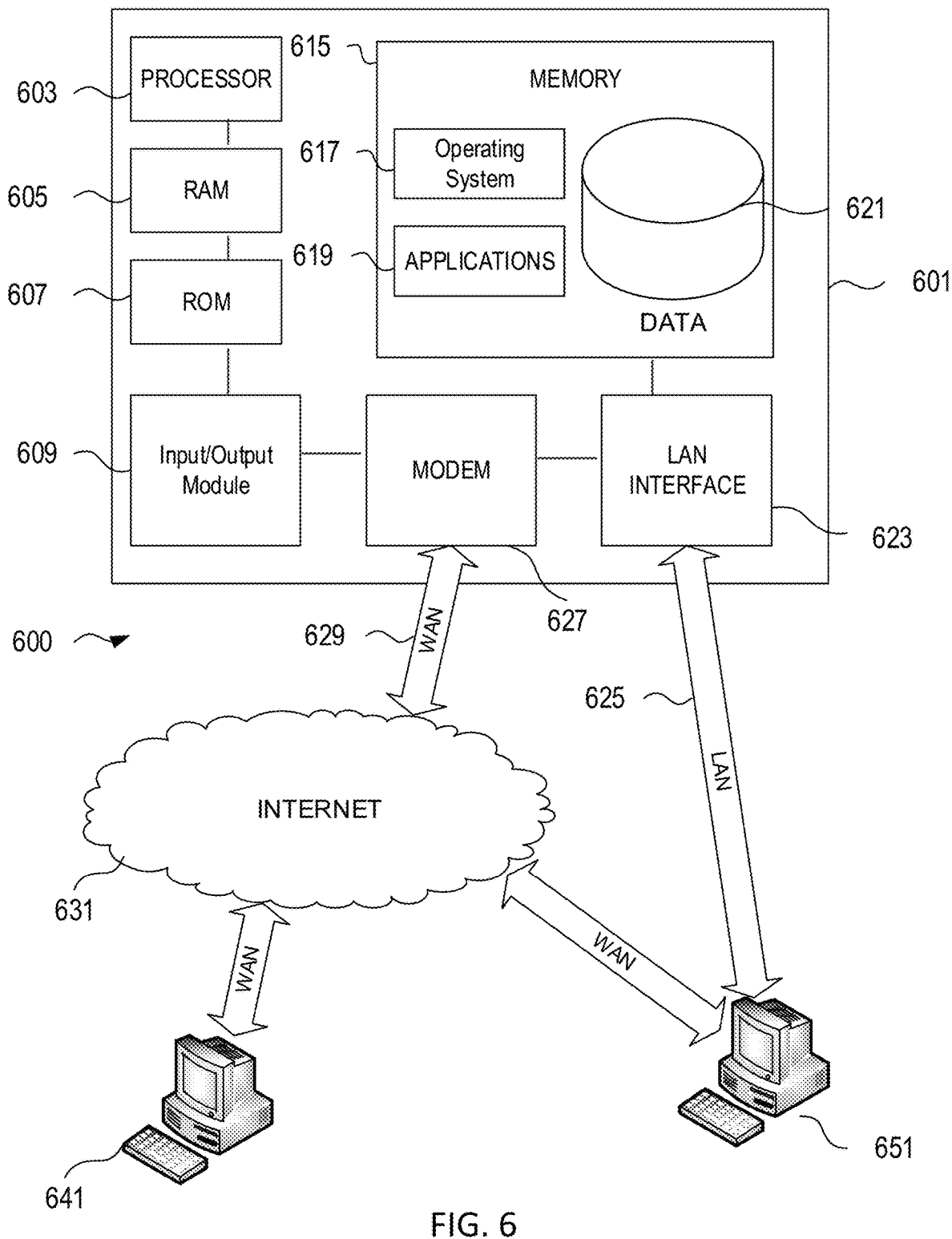
FIG. 6 shows an illustrative operating environment in which various aspects of the disclosure may be implemented, according to one or more aspects described herein.

As such, the protocol-agnostic file transfer apparatus 102, or one or more of the modules of the apparatus 102 may be implemented as one or more network-linked computer devices, such as device 601 from FIG. 6. Thus, the protocol-agnostic file transfer apparatus 102 may be implemented on consolidated computing hardware, such as computing device 601, at a single geographic location, and/or on a single integrated circuit, and the like. In another example, the protocol-agnostic file transfer apparatus 102 may be implemented across multiple computing devices at a common, or dispersed geographic locations. In one example, the device 601 may be in communication with devices 641 and 651 using one or more networking technologies (625, 629, and/or 631) described in further detail in the description that follows.

In one example implementation, computing device 601 may have a processor 603 for controlling overall operation of device 601 and its associated components, including RAM 605, ROM 607, an input/output (I/O) module 609, and memory 615. In one example, as will be apparent to those of ordinary skill in the art, memory 615 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 615 may comprise a non-transitory computer-readable medium that may communicate instructions to processor 603 to be executed.

I/O module 609 may include a microphone, keypad, touch screen, and/or stylus through which a user of the computing device 601 may provide input, and may also include one or more of a speaker for providing audio output and a video display device for providing textual, audiovisual and/or graphical output. Software may be stored within memory 615 and/or storage to provide instructions to the processor 603 for allowing the computing device 601 to perform various functions. For example, memory 615 may store software used by the computing device 601, such as an operating system 617, application programs 619, and an associated database 621. The processor 603 and its associated components may allow the computing device 601 to run a series of computer-readable instructions to process and format data.

The computing device 601 may operate in a networked environment supporting connections to one or more remote computers, such as computing devices 641 and 651. In one example, the computing devices 641 and 651 may be personal computers or servers that include many, or all, of the elements described above relative to the computing device 601. Specifically, the computing device 641 may represent one or more elements of the remote environment 120 and computing device 651 may represent one or more elements of the destination environment 140. Alternatively, computing device 641 and/or 651 may be a data store that is affected by the operation of the computing device 601. The network connections depicted in FIG. 6 include a local area network (LAN) 625 and a wide area network (WAN) 629, but may also include other networks. When used in a LAN networking environment, the computing device 601 is connected to the LAN 625 through a network interface or adapter 623. When used in a WAN networking environment, the computing device 601 may include a modem 627 or other means for establishing communications over the WAN 629, such as the Internet 631. It will be appreciated that the network connections shown are illustrative and other means of establishing a communications link between the computers may be used. In one implementation, the various elements described in relation to the protocol-agnostic file transfer apparatus 102 may be configured to accept inbound networking communications and/or transfer outbound networking communications to one or more networking protocols. These networking protocols may include any of various well-known protocols such as TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (WebDAVS), Trivial File Transfer Protocol (TFTP), Applicability Statement 2 (AS2), Odette File Transfer Protocol (OFTP), and Accelerated File Transfer Protocol (AFTP). Communication between one or more of computing devices 601, 641, and/or 651 may be wired or wireless, and may utilize Wi-Fi, a cellular network, Bluetooth, infrared communication, or an Ethernet cable, among many others.

An application program 619 used by the computing device 601 according to an illustrative embodiment of the disclosure may include computer-executable instructions for invoking functionality related to a protocol-agnostic file transfer apparatus 102. The computing device 601 and/or the other devices 641 or 651 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one implementation, the intelligent scanner device 102 is configured to reduce time needed to manually annotate, and error resulting from this manual annotation of scanned documentation. This intelligent scanner device facilitates improved accuracy in document annotation by enforcing metadata index thresholds and by using one or more artificial intelligence processes to automate certain aspects of the document scanning, storage and retrieval processes.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, this disclosure includes an intelligent scanner device that has an image processor configured to receive captured image data, and an identification engine, configured to receive identification information associated with a user. The intelligent scanner device may additionally include a metadata engine that is configured to automatically generate first metadata for the received image data, based upon the identification information associated with the user. The metadata engine may additionally receive and verify second metadata for the received image data, from an external source. The metadata engine may also implement a data retention process that prevents the received image data from being stored within an internal storage device until the first and second metadata fulfill one or more metadata index thresholds. The metadata engine may also combine the first and second metadata with the captured image data to generate an indexed image structure, and store the indexed image structure in the internal storage device.

In one implementation, the identification engine of the intelligent scanner device is further configured to recognize document information from the captured image data using optical character recognition. The first metadata may be generated using the recognized document information.

In another implementation, the identification engine may be further configured to generate identification information using an image of the user, captured by the intelligent scanner device.

In another implementation, the data retention process prevents the received image data from being stored within the internal storage device if the identification engine detects that the image data is blurred.

In another example, the data retention process prevents the received image data from being stored within the internal storage device if the metadata engine detects that the image data is incomplete.

In another example, the identification information includes a geographic location of the user, and the one or more metadata index thresholds prevents the received image data from being stored if the geographic location of the user does not align with an approved location of the user.

In one example, the geographic location of the user is received from a location-determining sensor.

The intelligent scanner device may receive the captured image data from an image-capturing device.

In another example, the captured image data may be received by the intelligent scanner device from an external database.

In another aspect, an intelligent scanner device may include a processor, and a non-transitory computer-readable medium that has computer-executable instructions that when executed by the processor are configured to capture image data, received identification information associated with the user, automatically generate first metadata from the received image data, based upon the dedication information associated with the user. The computer-executable instructions are further configured to receive and verify second metadata for the received image data, from an external source, and implement a data retention process preventing the received image data from being stored within an internal storage device until the first and second metadata fulfill one or more metadata index thresholds. The computer-executable instructions are further configured to combine the first and second metadata with the captured image data to generate an indexed image structure, and store the indexed image structure in the internal storage device.

The non-transitory computer-readable medium may also include computer-executable instructions that when executed by the processor are further configured to recognize document information from the captured image data using optical character recognition, and generate the first metadata using the recognize document information.

The computer-executable instructions may also be configured to generate identification information using a captured image of the user.

The computer-executable instructions may also be configured to prevent the received image data from being stored within the internal storage device it is detected that the image data is blurred.

The computer-executable instructions may also be configured to prevent the received image data from being stored within the internal storage device if it is detected that the image data is incomplete.

In another example, the identification information includes a geographic location of the user, and the geographic location of the user may be received from a location-determining sensor.

In another example, the captured image data is received from an image capturing device or an external database.

In another aspect, a method for intelligent scanning may include capturing, using an image processor, image data. The method may additionally include receiving identification information associated with the user and automatically generating, using a metadata engine first metadata for the received image data, based upon the identification information associated with the user. The method may additionally include receiving and verifying, by the metadata engine, second metadata for the received image data, from an external source. The method may additionally include implementing, by the metadata engine, a data retention process preventing the received image data from being stored within an internal storage device until the first and second metadata fulfill one or more metadata index thresholds. The method may additionally include combining, by the metadata engine, the first and second metadata with the captured image data to generate an indexed image structure, and storing by the metadata engine the indexed image structure in the internal storage device.

The method may additionally include recognizing document information from the captured image data using optical character recognition, such that the first metadata is generated using the recognized document information.

Accordingly, it will be understood that the invention is not to be limited to the embodiments disclosed herein, but is to be understood from the following claims, which are to be interpreted as broadly as allowed under the law.

What is claimed is:

1. An intelligent scanner device comprising:
   an image processor configured to receive captured image data of a document;
   an identification engine, configured to receive identification information associated with a user;
   a metadata engine, configured to:
   detect detected biographic data about a customer within the document;
   obtain provided biographic data from the customer about the customer presenting the document;
   only when the detected biographic data matches the provided biographic data, automatically generate first metadata for the received captured image data, based on the identification information associated with the user;
   receive and verify second metadata for the received image data, from an external source;
   identify a document type associated with the received captured image data;
   generate one or more metadata index thresholds based on a detected characteristic of the received captured image data, wherein the one or more metadata index thresholds varies with the document type;
   implement a data retention process preventing the received image data from being stored within an internal storage device until the first and second metadata fulfill the one or more metadata index thresholds;
   combine the first and second metadata with the captured image data to generate an indexed image structure;

store, in response to the data retention process, the indexed image structure in the internal storage device only when the first metadata and the second metadata meet the one or more metadata index thresholds; and when the first and second metadata do not meet the one or more metadata index thresholds, continue to receive and verify the second metadata until the one or more metadata index thresholds are met.

2. The intelligent scanner device of claim 1, wherein the identification engine is further configured to recognize document information from the captured image data using optical character recognition, and wherein the first metadata is generated using the recognized document information.

3. The intelligent scanner device of claim 1, wherein the identification engine is further configured to generate identification information using an image of the user, captured by the intelligent scanner device.

4. The intelligent scanner device of claim 1, wherein the data retention process prevents the received image data from being stored within the internal storage device if the identification engine detects that the image data is blurred.

5. The intelligent scanner device of claim 1, wherein the data retention process prevents the received image data from being stored within the internal storage device if the metadata engine detects that the image data is incomplete.

6. The intelligent scanner device of claim 1, wherein the identification information includes a geographic location of the user, and the one or more metadata index thresholds prevents the received image data from being stored if the geographic location of the user does not align with an approved location of the user.

7. The intelligent scanner device of claim 6, wherein the geographic location of the user is received from a location-determining sensor.

8. The intelligent scanner device of claim 1, wherein the captured image data is received from an image-capturing device.

9. The intelligent scanner device of claim 1, wherein the captured image data is received from an external database.

10. An intelligent scanner device, comprising:
a processor;
a non-transitory computer-readable medium comprising computer-executable instructions that when executed by the processor are configured to:
capture image data of a document;
receive identification information associated with a user;
detect detected biographic data about a customer within the document;
obtain provided biographic data from the customer about the customer presenting the document;
only when the detected biographic data matches the provided biographic data, automatically generate first metadata for the captured image data, based on the identification information associated with the user;
receive and verify second metadata for the captured image data, from an external source;
identify a document type associated with the captured image data;
generate one or more metadata index thresholds based on a detected characteristic of the captured image data, wherein the one or more metadata index thresholds varies with the document type;
implement a data retention process preventing the captured image data from being stored within an internal storage device until the first and second metadata fulfill one or more metadata index thresholds;
combine the first and second metadata with the captured image data to generate an indexed image structure;
store, response to the data retention process the indexed image structure in the internal storage device only when the first metadata and the second metadata meet the one or more metadata index thresholds; and
when the first and second metadata do not meet the one or more metadata index thresholds, continue to receive and verify the second metadata until the one or more metadata index thresholds are met.

11. The intelligent scanner device of claim 10, wherein the non-transitory computer-readable medium comprises computer-executable instructions that when executed by the processor are further configured to: recognize document information from the captured image data using optical character recognition, and generate the first metadata using the recognized document information.

12. The intelligent scanner device of claim 10, wherein the non-transitory computer-readable medium comprises computer-executable instructions that when executed by the processor are further configured to: generate identification information using a captured image of the user.

13. The intelligent scanner device of claim 10, wherein the non-transitory computer-readable medium comprises computer-executable instructions that when executed by the processor are further configured to: prevent the captured image data from being stored within the internal storage device if it is detected that the image data is blurred.

14. The intelligent scanner device of claim 10, wherein the non-transitory computer-readable medium comprises computer-executable instructions that when executed by the processor are further configured to: prevent the captured image data from being stored within the internal storage device if it is detected that the image data is incomplete.

15. The intelligent scanner device of claim 10, wherein the identification information includes a geographic location of the user.

16. The intelligent scanner device of claim 15, wherein the geographic location of the user is received from a location-determining sensor.

17. The intelligent scanner device of claim 10, wherein the captured image data is received from an image capturing device.

18. The intelligent scanner device of claim 10, wherein the captured image data is received from an external database.

19. A method for intelligent scanning, comprising:
capturing, using an image processor, image data of a document;
receiving identification information associated with a user;
detecting detected biographic data about a customer within the document;
obtaining provided biographic data from the customer about the customer presenting the document;
only when the detected biographic data matches the provided biographic data, automatically generating, using a metadata engine, first metadata for the captured image data, based on the identification information associated with the user;
receiving and verifying, by the metadata engine, second metadata for the captured image data, from an external source;
identifying a document type associated with the captured image data;
generating one or more metadata index thresholds based on a detected characteristic of the captured captured image data, wherein the one or more metadata index thresholds varies with the document type;

implementing, by the metadata engine, a data retention process preventing the captured image data from being stored within an internal storage device until the first and second metadata fulfill one or more metadata index thresholds;

combining, by the metadata engine, the first and second metadata with the captured image data to generate an indexed image structure;

storing, in response to the data retention process by the metadata engine, the indexed image structure in the internal storage device only when the first metadata and the second metadata meet the one or more metadata index thresholds; and when the first and second metadata do not meet the one or more metadata index thresholds, continuing to receive and verify the second metadata until the one or more metadata index thresholds are met.

20. The method of claim 19, further comprising: recognizing document information from the captured image data using optical character recognition, wherein the first metadata is generated using the recognized document information.

21. The intelligent scanner device of claim 1, wherein the image processor is configured to detect whether the received captured image data contains a text component and wherein the identification engine is configured to:

compare scanned text data in the text component with a stored standardized text data;

when the identified document type comprises a first document type, detect whether a scanned text string comprises a first standardized text string, wherein the first standardized text string is different from a second standardized text string for a second document type;

when the scanned text string does not match the first standardized text string, generate a rescan indication; and when the scanned text string does match the first standardized text string, authorize the metadata engine to generate the indexed image structure.

22. The intelligent scanner device of claim 1, wherein the metadata engine is configured to:

when the detected biographic data does not match the provided biographic data, obtain additional data from the customer; and determine a relationship between the customer and the document.

* * * * *